(12) United States Patent
Maier et al.

(10) Patent No.: US 8,727,300 B2
(45) Date of Patent: May 20, 2014

(54) MOUNTING PLATE FOR A MACHINE BASE

(75) Inventors: Robert Maier, Babenhausen (DE);
Hubert Schaub, Waltenhofen (DE);
Florian Nobis, Buxheim (DE)

(73) Assignee: Multivac Sepp Haggenmueller GmbH & Co. KG, Wolfertschwenden (DE)

( * ) Notice: Subject to any disclaimer, the term of this patent is extended or adjusted under 35 U.S.C. 154(b) by 0 days.

(21) Appl. No.: 13/330,852

(22) Filed: Dec. 20, 2011

(65) Prior Publication Data
US 2012/0153118 A1  Jun. 21, 2012

(30) Foreign Application Priority Data

Dec. 21, 2010 (DE) .......................... 10 2010 055 437

(51) Int. Cl.
| F16M 1/00 | (2006.01) |
| F16M 3/00 | (2006.01) |
| F16M 5/00 | (2006.01) |
| F16M 7/00 | (2006.01) |
| F16M 9/00 | (2006.01) |
| F16M 11/00 | (2006.01) |
| A47F 5/00 | (2006.01) |
| A47H 1/10 | (2006.01) |

(52) U.S. Cl.
USPC .......................... 248/674; 248/678; 248/300

(58) Field of Classification Search
CPC ........... F16M 7/00; F16M 13/00; H02K 5/00; F02B 67/00; B41J 29/02
USPC .................. 248/674, 676, 677, 678, 680, 681
IPC .................... F16M 1/00,3/00, 5/00, 7/00, 9/00, F16M 11/00
See application file for complete search history.

(56) References Cited

U.S. PATENT DOCUMENTS

| D87,702 S | * | 9/1932 | Schwarz ........................ D8/366 |
| 2,651,483 A | * | 9/1953 | Ritchie et al. ................. 248/680 |
| 5,890,696 A | * | 4/1999 | Ozawa .......................... 248/677 |
| RE37,249 E | * | 6/2001 | Leibinger et al. ............. 606/281 |
| 6,334,372 B2 | * | 1/2002 | Kuo et al. ..................... 248/605 |
| 6,944,994 B2 | * | 9/2005 | Hendzel ....................... 52/127.2 |
| 7,254,919 B2 | * | 8/2007 | Lutz et al. ...................... 52/92.2 |
| 2002/0100855 A1 | * | 8/2002 | Zupan et al. .................. 248/674 |
| 2004/0055230 A1 | | 3/2004 | Hendzel |
| 2004/0164210 A1 | * | 8/2004 | Le et al. ........................ 248/200 |

OTHER PUBLICATIONS

German Search Report Dated Oct. 6, 2011, Application No. 10 2010 055 437.5, Applicant MULTIVAC Sepp Haggenmueller GmbH & Co. KG, 5 Pages.

* cited by examiner

*Primary Examiner* — Jonathan Liu
*Assistant Examiner* — Muhammad Ijaz
(74) *Attorney, Agent, or Firm* — Husch Blackwell LLP

(57) ABSTRACT

The disclosure relates to a mounting plate for fixing a machine base. The mounting plate comprises a slot in a second region, said slot comprising a first narrow section and a broad section for enclosing the machine base.

20 Claims, 5 Drawing Sheets

MOUNTING PLATE FOR A MACHINE BASE

CROSS-REFERENCE TO RELATED APPLICATIONS

This application claims foreign priority benefits under 35 U.S.C. §119(a)-(d) to German patent application number DE 102010055437.5, filed Dec. 21, 2010, which is incorporated by reference in its entirety.

TECHNICAL FIELD

The disclosure relates to a mounting plate for fixing a machine base.

BACKGROUND

Mounting plates which are fastened to the ground are already known, the ground part of a machine base only being enclosed or gripped at its outer sides in order to avoid slipping of the machine base on the ground. Such a mounting plate rests on the ground, for example a flagged floor, and gaps between mounting plate and ground will arise, for instance in the region of the joints, as well as between mounting plate and machine base, which are hardly accessible and, therefore, cannot be cleaned sufficiently in order to comply with the requirements of food industries.

An alternative mounting plate is mounted in such a manner that the ground part of the machine base is pressed with a large force to the ground by means of a screw connection from above through the mounting plate so as to enhance the contact power between the machine base and the ground and, thus, to avoid that the machine base gets out of its place. In this case, there spaces or gaps between mounting plate and machine base will arise which are rarely accessible and cannot be cleaned in a sufficient manner.

SUMMARY

It is an object of the present disclosure to provide for a hygienic mounting plate for fixing a machine base with improved cleaning possibilities, e.g., in the food sector.

A mounting plate according to the present disclosure for fixing a machine base comprises at least one opening through which a fastening means is passed in a first region which is, when in the mounted condition, in contact with a ground or floor, and the mounting plate comprises a slot in a second region. The slot includes a first narrow section and a second broad section, said second broad section enclosing a preferably partially circular part of the machine base by more than 180°, preferably more than 220°. A machine base standing vertically to the ground is, thus, secured against lateral displacement on the ground.

Preferably, a supporting land is provided to exert a force via the mounting plate to the part of the machine base positioned on the ground so as to urge or press the machine base to the ground and, thus, to improve the displacement or nonslip safety.

The supporting land is preferably mounted perpendicularly to the mounting plate, so as to enable that the supporting land may be designed in a correspondingly narrow shape, since there are hardly any lateral forces occurring in said arrangement.

To obtain improved sanitary or hygienic properties, the supporting land and the mounting plate are preferably made of high-grade steel.

Preferably, the supporting land has been welded to the mounting plate, in order to allow for a more inexpensive structure and to avoid negative influences on the hygienic properties that might occur, e.g., through multi-part screw connections.

Advantageously, the supporting land is a bent tongue of the mounting plate. Two tongues are also conceivable as supporting land.

To obtain improved cleaning possibilities, the surfaces of the second region of the mounting plate which face upwards when in the mounted condition are preferably substantially inclined to the horizontal or curved.

Advantageously, when in the mounted condition, a marginal area of the mounting plate is oriented in a vertical manner with regard to the ground and comprises a recess, so as to have, on the one hand, two small supporting or bearing surfaces of the mounting plate on the ground and to allow, on the other hand, for good cleaning possibilities on account of said recess.

The broad slot section in the mounting plate is preferably of an oval or arch-shape contour, thus providing three contact points for an improved base fixing, due to an inclined position of the slot to the perpendicular part of the mostly circular machine base. However, it might also be conceivable to have the broad section designed in the form of a triangular contour so as to have three contact points.

Preferably, the broad slot section is of a polygonal contour.

Mounting plates according to the disclosure are especially used for packaging machines, in particular for very long deep-drawing packaging machines and occasional equipment, e.g., as foil reception means, supplying and discharging means and robots, as used in the food industry on hall floors which are flagged or tiled for cleaning purposes and provided with inclined drainage facilities. In those cases where food such as cold meat or cheese is to be packaged, machines and floors have to be cleaned properly so that no product leftovers remain in craps and gaps and hidden spaces, particularly at or inside of the machines, in order to prevent that any germs or bacteria might be generated.

An advantageous embodiment of the disclosure will be explained in more detail with reference to the below drawings.

DETAILED DESCRIPTION

Throughout the Figures, same components were given same reference numbers.

Figure 1:
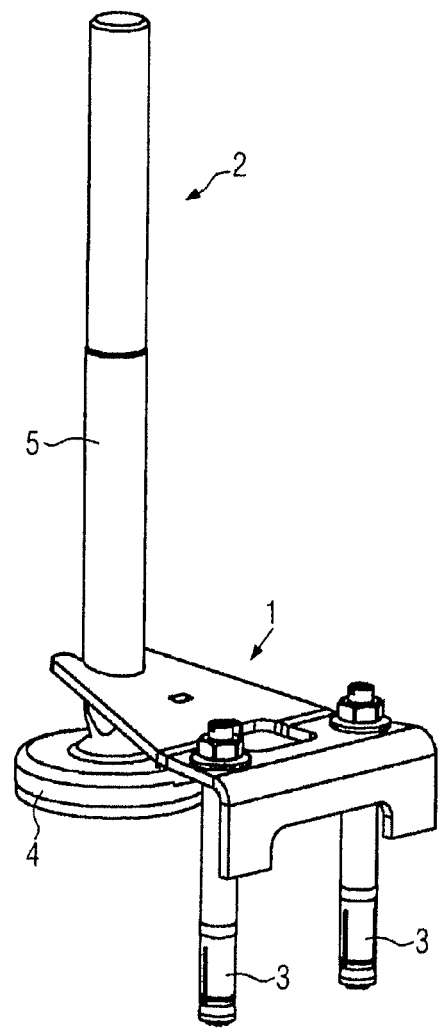
FIG. 1 is a perspective view of a mounting plate according to the present disclosure in a mounted condition.

FIG. 1 shows a mounting plate 1, according to the present disclosure, that has been mounted to a machine base 2, such as a packaging machine base. To this end, mounting plate 1 is firmly fixed in the ground 50 or other support surface by means of two screw connections 3 (see FIG. 2). Machine base 2 comprises a plate 4 resting on ground 50 and a circular area 5.

Figure 2:
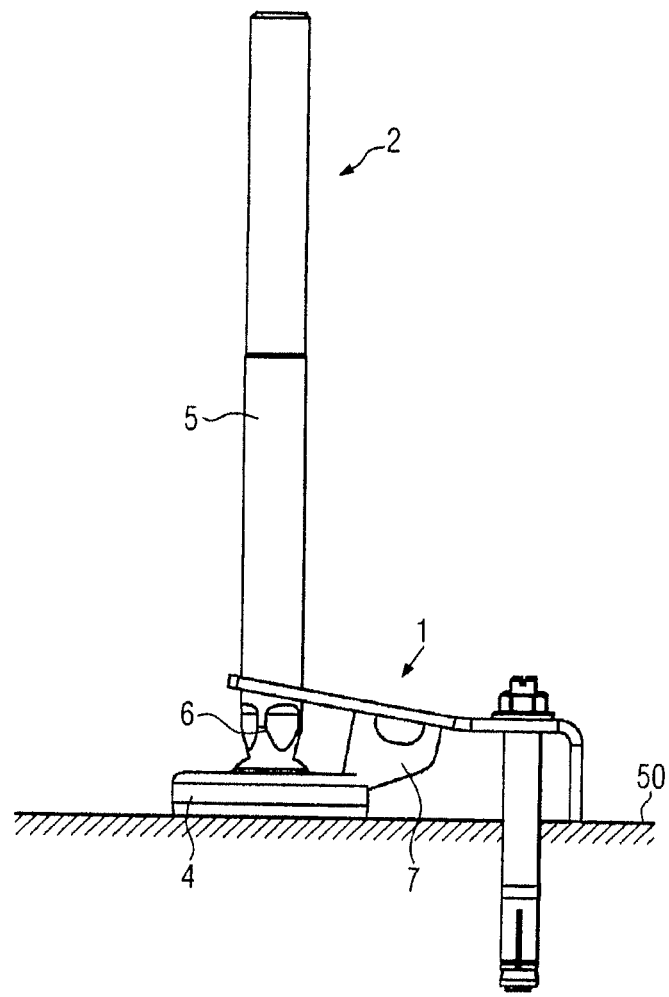
FIG. 2 is a side view of the mounting plate shown in FIG. 1.

FIG. 2 shows still another region 6 of machine base 2 partially having smaller outer dimensions than circular area 5. A support member or portion, such as supporting land 7, is connected to mounting plate 1 for supporting mounting plate 1 on plate 4 of machine base 2.

Figure 3:
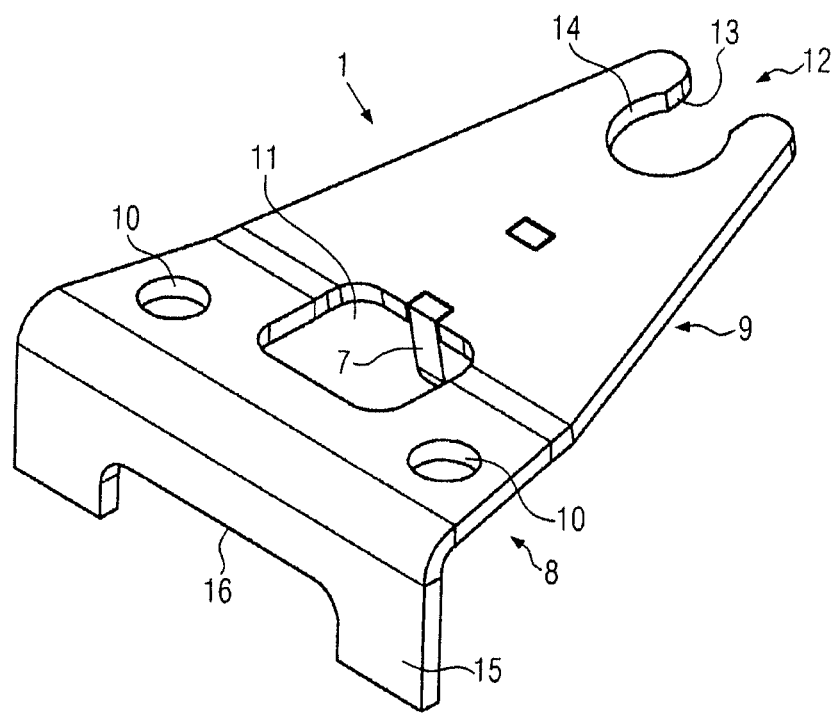
FIG. 3 is a perspective view of the mounting plate.

FIG. 3 shows mounting plate 1 having a plate body with a first region 8 and a second region 9. In said first region 8, two receiving portions, such as openings 10, for screw connections 3 or similarly acting fastening means or members are provided. An opening 11 provides for improved cleaning possibilities, for instance by means of vapor or high-pressure cleaners. In the second region 9 there is provided a slot 12 which is open towards the outside and comprises a first narrow outer section 13 and a second broad inner section 14. First narrow section 13 is of a minimum width enabling that mounting plate 1 can be mounted in region 6 of machine base 2 in such a manner that broad section 14 of slot 12 of mounting plate 1 can subsequently be guided upwards into area 5 of machine base 2.

After that, mounting plate 1 can be swiveled in such a manner that a bearing surface 17 (see FIG. 4) of supporting land 7 oriented downwards to plate 4 rests on a rim of plate 4 (see FIG. 2). To this end, broad section 14, here shown in circular shape, comes into contact with circular region 5 of the machine base at several points, preferably in the vicinity of the transition from broad section 14 to narrower section 13 and a region next to supporting land 7. The force generated by means of screw connection 3 in the first region 8 to mounting plate 1 acts through supporting land 7 to plate 4 as well as through broad section 14 to area 5 of machine base 2, thereby fixing said machine base 2, after having oriented the packaging machine or all machine feet 2, without being required that machine feet 2 have at least partially to be dismounted for such fixation to the ground 50.

To this end, supporting land 7 is mounted in two recesses of mounting plate 1 in second region 9 and connected to the plate body of mounting plate 1 through a weld joint (not shown) at the lower side thereof. Supporting land 7 stands upright onto second region 9 of mounting plate 1.

The marginal area 15 of mounting plate 1 is oriented vertically to first region 8 and comprises a recess 16 which is open to one side. Like opening 11, recess 16 serves to improve the cleaning possibilities. Alternatively, marginal area 15 can be omitted and replaced by bushings surrounding fastening means 3.

Figure 4:
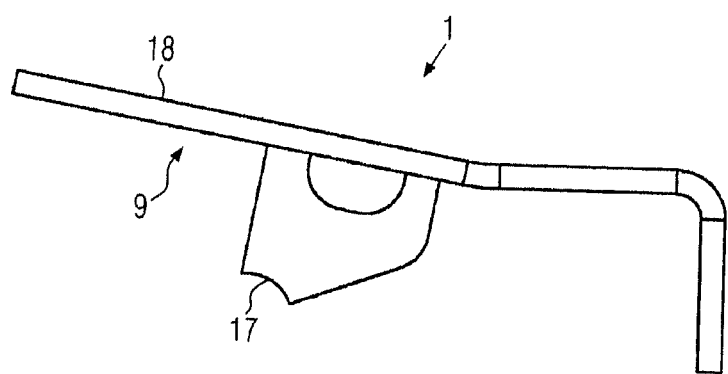
FIG. 4 is a side view of the mounting plate shown in FIG. 3.

FIG. 4 shows supporting land 7 with a bearing surface 17 facing away from mounting plate 1. Surface 17 is preferably congruent with the region of plate 4 where supporting land 7 is being supported.

Upwards directing surface 18 of second region 9 of mounting plate 1 is of an inclined design so as to allow cleansing agents or rinsing water to run off and not to remain on mounting plate 1.

Figure 5:
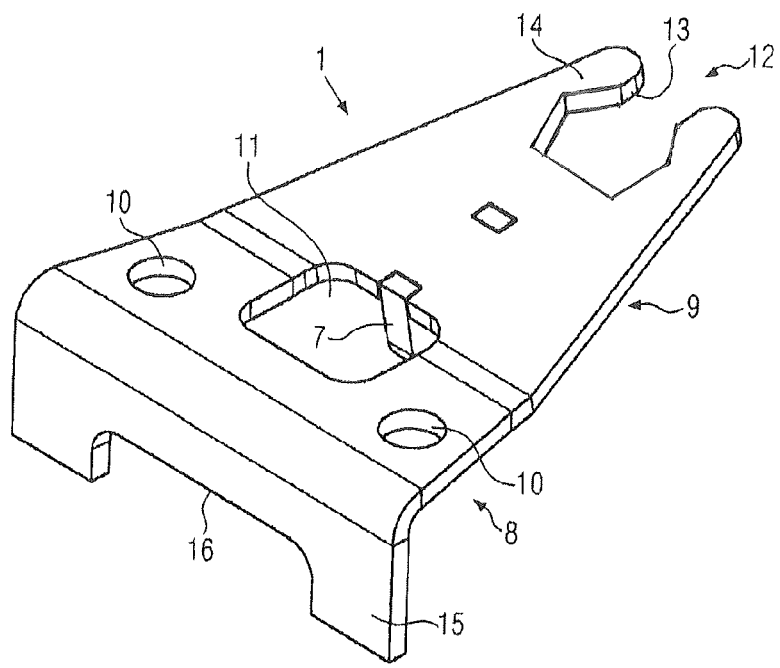
FIG. 5 is a perspective view of another embodiment of a mounting plate in accordance with the teachings of the present invention.
Figure 6:
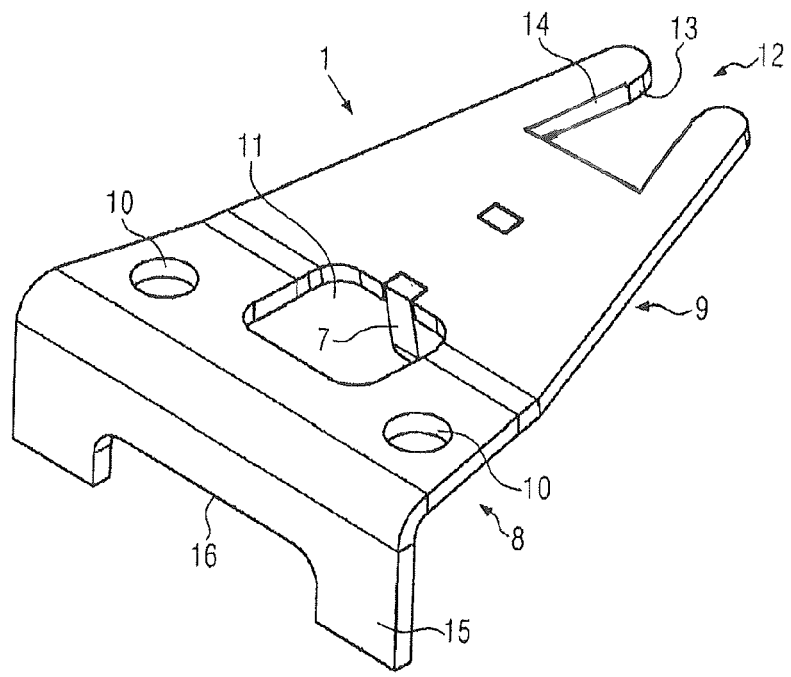
FIG. 6 is a perspective view of another embodiment of a mounting plate in accordance with the teachings of the present invention.

FIG. 5 illustrates an embodiment wherein broad section 14 is of a polygonal contour. Moreover, as shown in FIG. 6, it is conceivable to have broad section 14 designed in the form of a triangular contour as shown so as to have three contact points.

While exemplary embodiments are described above, it is not intended that these embodiments describe all possible forms of the invention. Rather, the words used in the specification are words of description rather than limitation, and it is understood that various changes may be made without departing from the spirit and scope of the invention. For example, features of various implementing embodiments may be combined to form further embodiments of the invention. In addition, other embodiments may be practiced without one or more of the specific features explained in the above description.

What is claimed is:

1. A mounting plate for fixing a machine base, the mounting plate comprising: a first and second regions, the first region having at least one opening through which a fastening member is passable such that the fastening member is contactable with a support surface when the mounting plate is in a mounted condition, and the second region including a slot having a first narrow outer section and a second broad inner section being wider than the first narrow outer section, the second broad inner section of the slot encloses a region of the machine base by more than 180 degrees in the mounted condition and wherein at least a portion of the first region contacts the support surface and a least a portion of the second region contacts the machine base in the mounted condition and creates a frictional engagement therewith of sufficient resistance to fix the machine base when the mounting plate is mounted on the machine base: a supporting land extending generally downwardly from the Second region to contact and exert force on a plate of the machine base when the mounting plate is in the mounted condition; and wherein, when the mounting plate is in the mounted condition, an upwardly facing surface of the second region is substantially inclined relative to the horizontal plane in a direction outward from the first region.

2. The mounting plate according to claim 1 wherein the supporting land is substantially perpendicularly mounted to the second region.

3. The mounting plate according to claim 1 wherein the supporting land and the first and second regions are made of high-grade steel.

4. The mounting plate according to claim 1 wherein the supporting land is welded to the second region.

5. The mounting plate according to claim 1 wherein the supporting land is provided as a bent tongue of the mounting plate.

6. The mounting plate according to claim 1 further comprising a marginal region that is vertically oriented and comprises a recess.

7. The mounting plate according to claim 1 wherein the broad inner section of the slot has either an oval or arch-shaped contour.

8. The mounting plate according to claim 1 wherein the broad inner section of the slot is of a polygonal contour.

9. The mounting plate according to claim 1 wherein the plate of the machine base is positioned on the ground and the supporting land presses the plate of the machine base against the ground.

10. A mounting arrangement for fixing a machine base, the mounting arrangement comprising: a mounting plate including first and second regions, the first region having an opening, and the second region including a slot having a closed end and an open end, the slot having a first narrow section proximate the open end and a second broad section proximate the closed end, wherein the second broad section is wider than the first narrow section and wherein the second broad section encloses a region of the machine base by more than 180 degrees when and creates a frictional engagement therewith of sufficient resistance to fix the machine base when the mounting plate is mounted on the machine base; a fastening member that is configured to pass through the opening and contact a support surface when the mounting plate is mounted on the machine base; a support member extending generally downwardly from the second region to contact and exert force on a plate of the machine base when the mounting plate is in a mounted condition; and wherein, when the mounting plate is in the mounted condition, the second region of the mounting plate is angled upwardly and outwardly with respect to the first region.

11. The mounting arrangement of claim 10 wherein the first region of the mounting plate includes a plurality of the openings, and the mounting arrangement includes a plurality of the fastening members, each fastening member being configured to pass through a respective one of the openings and contact the support surface when the mounting plate is mounted on the machine base.

12. The mounting arrangement of claim 10 wherein the mounting plate has a plate body including the first and second regions.

13. The mounting arrangement of claim 12 wherein the support member is generally planar and is substantially perpendicularly mounted to the second region.

14. The mounting arrangement of claim 12 wherein the support member is welded to the second region.

15. The mounting arrangement of claim 12 wherein the support member is provided as a bent tongue of the mounting plate.

16. The mounting arrangement of claim 10 wherein the mounting plate further comprises a marginal region that is vertically oriented when the mounting plate is mounted on the machine base, and wherein the marginal region comprises a recess.

17. The mounting arrangement of claim 10 wherein the broad section of the slot has either an oval or arch-shaped contour.

18. The mounting arrangement of claim 10 wherein the broad section of the slot has a polygonal contour.

19. A mounting arrangement with a machine base, the mounting arrangement comprising: a machine base having a plate resting on the ground and said plate comprising a generally circular shaped area; a mounting plate including first and second regions, the first region having an opening, and the second region including a slot having a closed end and an open end, the slot having a first narrow section proximate the open end and a second broad section proximate the closed end, wherein the second broad section is wider than the first narrow section and the second region being angled upwardly and outwardly with respect to the first region when the mounting plate is mounted on the machine base; a support member extending generally downwardly from the second region to contact and exert force on the machine base plate when the mounting plate is in a mounted condition; wherein, when the mounting plate is in the mounted condition, the second region of the mounting plate is angled upwardly and outwardly with respect to the first region;

wherein the second broad section encloses a region of the machine base by more than 180 degrees and creates a frictional engagement therewith of sufficient resistance to fix the machine base when the mounting plate is mounted on the machine base; and a fastening member that is configured to pass through the opening and contact a support surface when the mounting plate is mounted on the machine base.

20. The mounting arrangement of claim 19 wherein the mounting plate fixes a packaging machine in the food industry to the support surface and the mounting plate further includes one or more apertures therethrough to facilitate the cleaning of the machine mounting arrangement.

* * * * *